3,751,389
Patented Aug. 7, 1973

3,751,389
THERMALLY HARDENABLE COMPOSITIONS
Tetsuya Hotta, Reiho Takabe, and Sadao Nishita, Iwaki, Japan, assignors to Kureha Kagaku Kogyo Kabushiki Kaisha, Nihonbashi Horidome-cho, Chuo-ku, Tokyo, Japan
No Drawing. Continuation of abandoned application Ser. No. 11,903, Feb. 16, 1970. This application Feb. 28, 1972, Ser. No. 230,044
Int. Cl. C08f 45/52; C08c 11/68
U.S. Cl. 260—28.5 B                                    6 Claims

ABSTRACT OF THE DISCLOSURE

A thermosetting composition is disclosed which is capable of providing molded products having high hardness and high softening point which comprises:
(a) 25–84.5 parts by weight of petroleum-cracked pitch obtained by subjecting petroleum or a petroleum product to thermocracking at a temperatrue of 700° C., or higher and separating the lighter fractions and constituents having a lower distillation point than 400° C., from the cracked residual mixture,
(b) 10–40 parts by weight of a rubber having unsaturated double bonds,
(c) 5–30 parts by weight of sulfur, and
(d) 0.5–5 parts by weight of a vulcanization accelerator, said pitch having a hydrogen to carbon atomic ratio of less than 1.0 and the total parts by weight of all constituents amounting to approximately 100.

CROSS-REFERENCE TO RELATED APPLICATION

This application is a continuation application of our earlier copending application, Ser. No. 11,903, filed Feb. 16, 1970, now abandoned, and claims priority from Feb. 19, 1969 based on Japanese patent application Ser. No. 12,272/69.

This invention relates generally to thermally hardenable compositions, and more specifically, it concerns thermosetting plastic compounds comprising pitch, rubber, sulfur and a vulcanization accelerator.

Petroleum pitch coming out as waste products in large quantities from petroleum refinery factories has had only limited utilities such as asphalt for road pavement, rust-preventing coating material, or the like.

According to prior proposals, an evenly distributed mixture of pitch with rubber was intended for use in broadening the limited utilities of pitch, failing, however, to provide therefrom molded products having a high hardness and superiorly heat-resistant performance.

On the other hand, it would be conceivable to produce molded products from an intimate mixture of asphalt, rubber and sulfur. On acount of a higher content of aliphatic components included in asphalt, the reactivity of the asphalt through the intermediary of rubber with sulfur is very small so that any solvent-resisting molded product, as ascertained by our numerous practical experiments. In addition, a fouling by bleeding of the non-reacted liquid constituents may frequently be observed on the surface of the molded products, as the time elapses.

According to a prior proposal, it was attempted to employ, as a molding compound, a mixture of coal pitch, rubber and sulfur. We have ascertained, however, that the coal pitch, contrary to the petroleum pitch, has a large mutual solubility with rubber so that the three-component mixture of the above kind provides only softer molded products than desired, which represent only a low degree of heat-resisting performance. On the other hand, it should be noted that coal pitch has generally a low molecular weight generally in the order of 300 or so that the molded products obtained from such compound represent lower softening points than desired. In addition, the coal pitch generally contains impurities which emit an unpleasant odor and stimulating action. The compound including coal pitch, and molded products from the compound are frequently too odorous to be accepted and even irritative to human skin.

On the other hand, although conventional petroleum pitch or asphalt coming from petroleum refinery factories represent substantial improvements in the problems of odor and irritation, it is defective in that it contains an abundant quantity of aliphatic components and thus has only a small reactivity with rubber and sulfur. Therefore, a compound comprising petroleum pitch, rubber and sulfur exhibits only a poor thermosetting performance, and provides when subjected to molding, generally softer molded products than desired. In addition, the bleeding phenomena caused by the existence of non-reacted asphalt and a poor solvent-resisting performance will be observed, as in the case of coal pitch.

The main object of the present invention is to provide superior thermosetting compositions capable of providing molded products having high hardness and high softening point and being practically odorless and non-irritative in nature.

The present invention resides in its broadest aspect and for the attaining the above-mentioned object, in a thermosetting composition comprising 25–84.5 wt. parts of petroleum-cracked pitch at 700° C. or higher temperature; 10–40 wt. parts of rubber having unsaturated double bonds; 5–30 wt. parts of sulfur and 0.5–5 wt. parts of vulcanization accelerator, the total amount being adjusted to 100%.

The petroleum pitch employed in this practice of the invention are those which may be obtained by submitting crude petroleum oil, heavy oil, naphtha or asphalt or any combination thereof to heat cracking at 700° C. or higher temperature and then distilling off the fractions of 400° C. and less temperatures from the cracked residual mixture of tar and pitch. In place of the distillation, the separation of the lower temperature fractions from the cracked residual mixture by the solvent extraction technique may be equally adopted. Therefore, it can be seen that the way of the separation of the above-mentioned purpose does not influence upon the nature of the petroleum-cracked pitch employable in this invention. Therefore, any person skilled in the art can employ suitable conventional ways applicable to said separation step, especially upon considering the most economical processing conditions, so far as the following specification be substantially observed on the thus separated petroleum pitch.

The petroleum-cracked pitch employable in the practice of the invention must advantageously have the hydrogen-to-carbon atomic ratio, H/C, of less than 1.0. The mean atomic ratio must preferably be higher than 400, as measured by the vapor pressure osmometer, while using benzene as the solvent, thus representing the number of average molecular weight.

In the above specification, the hydrogen-to-carbon atomic ratio is a reliable measure for the determination of the aromaticity of the employed petroleum-cracked pitch, thus defining the reactivity with sulfur and the softening point of the pitch. The softening point of the pitch depends further upon the mean molecular weight. In this case, the softening point has been determined in such a way that the pitch in its powder form is observed under a microscope and subjected to heating, the softening point being set to such elevated temperature at which the viewer can observe as fusing deformation of the pitch particles commences.

The pertoleum-cracked pitch employable in this invention can be obtained by subjecting a petroleum or petroleum product to thermal cracking at 700° C. or a higher temperature and separating the lighter fractions and constituents having a lower distillation point than 400° C. from the cracked residual mixture.

For carrying out the cracking, the petroleum material is placed in a tubular reactor which is heated up to the desired cracking temperature from outside.

As an alternative and more preferable way, a stream of combustion gases or highly superheated steam is maintained in a tubular reactor and the petroleum material is introduced in the form of vapor or in the form of an injected mist into the high temperature stream of the heating medium for bringing the both into an intimate physical and chemical contact with each other. The time for the thermal cracking may preferably extend between 0.001 to 2.0 seconds, depending upon the reaction temperature. The cracked products are then cooled by cold water or the like coolant.

As the rubber constituent used in the practice of the invention, a rubbery substance in the form of a polymer main component of which comprises diene compounds having conjugated double bonds may be employed. As representative examples thereof, polybuta-diene, SBR, NBR, polyisoprene and natural rubber may be enumerated.

As a sulfur constituent, sulfur may be used in the form of a fine powder and introduced into the processing mixture. Commonly used vulcanizing sulfur powder may be used without prejudice.

As the vulcanization accelerator, any one of commonly used accelerators for the vulcanization purpose can be used. Representative examples thereof are:

diphenyl guanidine;
di-ortho-tolylguanidine;
ortho-tolylbiguanide;
2-mercapto-benzothiazole;
di-benzothiazyl di-sulfide;
zinc salt of 2-mercapto-benzothiazole;
copper salt of 2-mercapto-benzothiazole;
N-cyclohexyl-2-benzothiazole sulphene amide;
2-(4-morpholivyl-dithio)benzothiazole;
tetra-ethyl thiuram-disulfide;
tetra-butyl thiuram-disulfide;
tetra-methylthiuram-monosulfide;
di-pentamethylene thiuram-tetra sulfide;
zinc salt of dimethyl-dithiocarbamic acid;
zinc salt of diothyl-dithiocarbamic acid;
zinc salt of dibutyl-dithiocarbamic acid;
zinc salt of ethylphenyl-dithiocarbamic acid;
piperidine-pentamethylene-dithiocarbamate;
sodium salt of diethyl-dithiocarbamic acid;
sodium salt of dibutyl-dithiocarbamic acid;
bismuth salt of dimethyl-dithiocarbamic acid;
copper salt of dimethyl-dithiocarbamic acid;
cadmium salt of diethyl-dithiocarbamic acid;
iron salt of dimethyl-dithiocarbamic acid;
selenium salt of diethyl-dithiocarbamic acid;
tellurium salt of diethyl-dithiocarbamic acid;
lead salt of dimethyl-dithiocarbamic acid;
pipecoline-pypecolyl-dithiocarbamate;
acetoaldehyde-aniline reaction product; and
butylaldehyde-aniline condensate.

As the vulcanization additives, zinc white; magensia; litharge; slaked lime; stearic acid and the like, commonly used in the rubber industry for similar purposes, may be used separately or in combination.

The dosing ratio of the main constituents of the moldable composition according to this invention may be defined as follows, taking account of the occasional possibilities for inclusion of inorganic or organic filler, additives and/or the like.

The dosing ratio of the main constituents, less fillers and additives must be as follows:

| | Wt. parts |
|---|---|
| High aromatic pitch | 25–84.5 |
| Rubbery substance | 10–40 |
| Sulfur | 5–30 |
| Vulcanization accelerator and additive | 0.5–5 | the total being 100 wt. parts.

It has been found that the petroleum-cracked pitch obtained by the thermal cracking of the pretroleum material and subjected to separating-off the lighter constituents from the cracked residual mixture has a superior performance of dissolving rubber substances as represented by polybutadiene, and that when the pitch dissolved with rubber is further added with sulfur and vulcanization accelerator conventionally used and the thus obtained mixture is heated, three-dimensional macromolecules are formed by the mutual bonding of pitch-rubber-sulfur.

It has still further been found that when the above-mentioned three constituents are selected within a specified mixing range, it is possible to heat the mixture at a comparatively low temperature and induce none of the three-dimensionalizing reactions but only prepare melt-formed products which can be subjected, however, to a further heat treatment at a still higher temperature for the formation of the desirous three-dimensional, non-soluble and non-fragile molded products.

The dose of the main constituents is limited as specified hereinbefore for the following reasons:

With the rubber constituent less than 10 wt. percent of the total of the main constituents, the molded products from the compound are too fragile to be accepted. On the other hand, when the dose of the rubber is higher than 40 wt. percent of the total amount of the main constituents, the molded products represent too lower softening point so that they can be accepted on account of deficiency of the desired degree of the hardness.

With a lower dose of sulfur than 5 wt. percent of the total amount of the main constituents, only and insufficient hardening reaction will be invited in the molded molded products which must be therefore discarded. With a higher dose of sulfur beyond 30 wt. percent, the molded products will show a roughened surface, the surface hardness of the products being reduced to an unacceptable value. Under extreme circumstances, non-reacted sulfur would deposit on the surface of the molded products by disadvantageous segregation.

The hardening reaction taking place by subjecting the composition according to this invention to a molding or the like thermoshaping step which can be carried out without the addition of a vulcanization accelerator and/or the additives used for the same purpose, when processing at a higher elevated temperature. But, generally speaking, the reaction velocity will be too slow to be acceptable and therefore an addition of the vulcanization accelerator is necessary to be adopted, and with occasional and further addition of the additives serving for the same purpose.

According to the proposal, as referred to hereinbefore, the vulcanization accelerator with occasional addition of the additives used for the same purpose will generally amount to 0.5–5:0 wt. percent of the total amount of the main constituents, for the realization of a practically acceptable hardening reaction appearing in the molding or the like final process.

The dosing ratio of the petroleum-racked pitch is determined as the rest of the total amount of the composition, less the included amounts of said rubber, sulfur and vulcanization accelerator, with occasional addition of the additives in the above sense. It amounts to 25–84.5 wt. percent of the total amount of the main constituents as was referred to hereinbefore.

800 wt. parts or less of inorganic or organic filler substance and/or reinforcing agent may be added to 100 wt. parts of the above-mentioned main constituents for the fomation of a ready-for-use moldable composition.

As the filler and reinforcing agents, talc; clay; calcium carbonate; carbon black, mica powder; glass fibers, carbon fibers; asbestos; wood powder; cellulosic fibers and/or the like may be used.

The mixing of the main constituents with the occasional addition of additives and fitters may be carried into effect by conventional mixing and kneading means, such as roll mixer, Banbury mixer, co-kneader, especially for the purpose of intimate mixing of the powder-state constituents with the rubber. The mixing process must preferably be carried out at an elevated temperature, but lower than 100° C., in order to avoid a premature vulcanization of the composition. The composition may be in the form of pellets or a fine powder, as the occasion may desire.

The thus prepared ready-for-use compound may be processed according to the conventional molding or the like technique. As an example, the compound may be extruded under pressure and at a temperature between 80 and 140° C. from an extrusion orifice of a conventional extruder into a mold which is then heated up to 170–220° C. for completion of the hardening reaction, thus providing a molded product. In place of the extruder, a calendering machine may be used for the production of rigid sheets, the operating temperature being preferably selected to 180–230° C. Rigid tubes can be manufactured on an extruder.

The formed or molded products under heat and pressure from the compositions proposed by the invention exhibit superior electric resistance characteristics and therefore can be utilized in the manufacture of various electrical parts. On account of the high values of hardness as well as the favorable heat-resisting properties of these products, they can be utilized as materials for various and useful industrial purposes, for example, in the form of rigid sheets, plates, bars, tubes or the like shaped materials and variously and differently shaped final products.

The invention may be understood more precisely by referring to the following several preferred numerical examples.

According to our experiments, the upper limit of the atomic ratio H/C should preferably be 1.0. With still higher values of this radio, the compound will show too much low reactivity in the course of thermal molding to be acceptable.

With lower values of the atomic ratio than 0.4, the molded products will show a higher softening point than desired and at the same time may contain an unacceptable content of seggregated constituents, resulting in a difficulty of providing the desirous superior and homogeneous molded products. With higher mean molecular weight of the petroleum-cracked pitch than 1,500, similar troubles will be encountered.

With lower mean molecular weight than 400 of the petroleum-cracked pitch, the hardeness of the molded products will become inferior and represent an unacceptable value of heat resistance.

EXAMPLE 1

Steam was superheated to about 2,000° C. by passing through a regenerative furnace filled with pebbles of silconium and then passed through a tubular reactor as a continuous stream at a rate of 5 kg./hr.

On the other hand, Seria crude oil was preheated to about 300° C. and injected at a rate of 1 kg./hr. into the stream of the superheated steam for performing the thermal cracking of the oil. The cracking was completed within 0.006 sec. and the final temperature of the cracked products as measured at the outlet end of the tube reactor amounted to about 1,200° C. The cracked products were then cooled to a temperature less than 100° C. by injecting thereinto cold water, and the gaseous constituents comprising ethylene, acetylene and the like were separated off at a rate of 700 lit./hr., while the residual of tar-like products was obtained at a rate of 450 gr./hr.

Then, 450 grs. of the tar-like products were distilled under reduced pressure, 100 mm. Hg, so as to remove fractions of 280° C. and lower, thereby obtaining 250 grs. of pitch.

According to the elemental analysis, the pitch showed a H/C atomic ratio of 0.61, the softening point being measured to 180–200° C. Mean molecular weight was measured to about 650.

Using the thus obtained petroleum-cracked pitch, a thermosetting compound of the following composition was prepared:

| | Wt. parts |
|---|---|
| Petroleum-cracked pitch | 58 |
| SBR-rubber | 20 |
| Sulfur, finely divided | 20 |
| Dibenzothiazyl sulfide (vulcanization accelerator) | 2 |
| Total | 100 |

For this purpose, SBR-rubber was kneaded in a Banbury mixer for 5 minutes and added with pitch powder, sulfur and dibenzothiazyl sulfide, the mixture being further kneaded together in the same mixer for about 15 minutes. The temperature of the charge increased to 90° C. and the kneaded products were taken out from the mixer and cooled down to room temperature. In this way, a ready-for-use compound according to this invention was obtained.

The compound was charged into a metal mold and subjected to heating at 200° C. under a pressure of 100 kgs./sq. cm. for 5 minutes.

The molded product consisted of a black plastic material having a glazing appearance and was similar to black phenolic resin products.

The material compound before molding was capable of dissolving in cold benzene, while the molded product showed, as a measure of polymerization, none of such tendency.

In the following Table 1, various properties, including favorable electrical characteristics, of the thus molded product are shown in comparison wtih those of comparative phenolic resin molded products. The product molded from the composition according to this invention showed rather favorable electrical characteristics over phenolic resins, especially higher electrical resistance of the former, as may be ascertained from the results measured upon two hours of boiling in water.

The molded product according to this invention showed superior solvent-resisting performance, and a high softening point comparative to that of phenolic resin. Mechanical properties were also superior and acceptable for various purposes.

TABLE I.—PROPORTIONS OF MOLDED PRODUCT

| | ASTM | Comparative phenolics | Molded product |
|---|---|---|---|
| Electrical: | | | |
| Volume resistivity, ohm-cm: | D257 | | |
| 50% RH, 23° C | | $2 \times 10^{12}$ | $6 \times 10^{14}$ |
| After 2 hrs. boil | | $5 \times 10^{10}$ | $5 \times 10^{14}$ |
| Dielectric constant: | D150 | | |
| $10_3$ cycles | | 8 | 3.4–3.8 |
| After 2 hrs. boil | | 49 | 3.6–4.1 |
| Dissipation factor: | D150 | | |
| $10_3$ cycles | | 0.14 | 0.006–0.013 |
| After 2 hrs. boil | | 0.80 | 0.012–0.018 |
| Dielectric strength (short time): | | | |
| 1/8" thickness, kv./mm | | 18 | 36–43 |
| After 2 hrs. boil | | 4 | 22–32 |
| Chemical resistance: | | | |
| $H_2O$ | | | (d) |
| 10% HCl and NaOH | | | (a) |
| 35% $H_2SO_4$ | | | (b) |
| 60% NaOH | | | (c) |
| Other properties: | | | |
| Thermal expansion, $10^{-5}/°C$ | D696 | 2.5–6.0 | 5 |
| Resistant to heat | | 120 | 110 |
| Deflection temp., 18.6 kg ° C | D648 | 120–130 | 110–115 |
| Mold shrinkage, percent | | 1.0–1.2 | 0.5 |
| Tensile strength, kg./mm² | D638 | 4.9–5.6 | (2.0–2.5) |
| Elongation, percent | D638 | 1.0–1.5 | 1.0–1.5 |
| Compressive strength, kg./mm² | D695 | 8–10 | 7 |
| Plexural yield strength, kg./mm² | D790 | 8–12 | 3.6–4.4 |
| Izod impact strength (V), kg. cm./cm. | D256 | 1.4–2.2 | 2.1 |
| Rockwell hardness (M) | D785 | 124–128 | 86 | a Not affected by boil.
b Not affected at 60° C.
c Not affected at 30° C.

The above-mentioned raw materials with the exception of surfur, vulcanization accelerator and zinc oxide, were processed on a calendering machine at 140° C. for 10 minutes until they were thoroughly and intimately mixed together and then the roll temperature was lowered to 90° C. Under these modified kneading conditions, the above kneaded mixture was added with sulfur, vulcanization accelerator and zinc oxide and further kneaded for 10 minutes. In this way, a sheet was obtained which was then subjected to heat at 190° C. under pressure for execution of thermal setting of the compound.

Various properties of the employed pitches, the corresponding cracking temperatures, H/C-atomic ratios, mean molecular weights, and Vicat test values on softening point as well as Izod test values on impact strength of the molded final products are shown in the following Table II.

From the test results on petroleum straight asphalt as reference, having a high value of H/C-atomic ratio, it will be clearly seen that the molded products prepared therefrom showed a lower and disadvantageous value of Vicat softening point and thus, they could not be accepted. As the time elapses, a bleeding of non-reacted asphalt was observed on the surface on the molded products. On the other hand, the products molded from the thermosetting compounds showed highly improved and acceptable properties of heat resistance and strength.

TABLE II

| | Cracking temp., degrees | Atomatic ratio: H/C of pitch or asphalt | Mean molecular weight | Vicat softening temp., °C. (ASTM D-1525-58T) | Izod impact strength (ASTM D-256) |
|---|---|---|---|---|---|
| Sample number: | | | | | |
| 1 | 1,040 | 0.55 | 750 | 188 | [1] 2.3 |
| 2 | 990 | 0.60 | 650 | 180 | 2.2 |
| 3 | 950 | 0.65 | 580 | 174 | 2.1 |
| 4 | 900 | 0.80 | 420 | 169 | 1.9 |
| 5 (reference) | | [2] 1.40 | | 66 | 2.0 |

[1] Kg. cm./cm., V-notch.
[2] Petroleum straight asphalt.

EXAMPLE 2

With use of a cracking apparatus similar to that employed in the foregoing Example 1, Seria crude oil was processed in the similar manner. In the present case, the reaction period amounted to 0.005 second, while the heating meduim was adjusted so that the final reaction temperature as measured at the discharge end of the tubular reactor amounted to 1,040, 990, 980 and 900° C., respectively. The respective reaction products were cooled as before by means of cold water, and then lighter fractions were distilled off by subjecting the residual tar to a distillation at 300° C. and 10 mm. Hg. In this way, four kinds of pitch were obtained having varying H/C-ratios and mean molecular weights, as shown in the following Table II. As a comparative reference, straight petroleum pitch was employed, as shown in the bottom line in the same table.

In each case, a pitch-including compound was prepared as follows:

| | Wt. parts |
|---|---|
| Pitch | 52 |
| Styrene-butadien copolymer (SBR) (manufactured by Nippon Gosei Gomu K.K., Product Model 1502) | 128 |
| Sulfur powder | 15 |
| Zinc oxide | 2 |
| N-cyclohexyl - 2 - benzothiazole sulfonamide (vulcanization accelerator) | 1.8 |
| Zinc salt of dimethyl dithiocarbamic acid | 1.2 |
| Total | 100 |

To this compound proper, 50 wt. parts of talc as filler were intimately admixed.

EXAMPLE 3

Propane, 340 lit./hr., and oxygen, 1,300 lit./hr., were brought into combustion and the thus obtained combustion gases, about 2,300° C., were led to flow through a tubular reactor, while vaporized naphtha, 500° C., was introduced at a rate of 1 kg./hr. into the flowing combustion gas stream, for being subjected to thermal cracking. The cracking reaction continued only for 0.02 second and the cracked mixture was measured to about 1,500° C. at the outlet end of the tubular reactor. The cracked mixture was then cooled by contact with cold water. In this way, 1,100 lit./hr. of gaseous products and 150 gr./hr. of tar-like products were obtained. The latter residual products, 150 gr., were distilled at 260° C. and under reduced pressure of 10 mm. Hg, thus obtaining 103 gr. of petroleum-cracked pitch as the final residue. This pitch showed 0.64 of H/C-atomic ratio, 170–195° C. of softening point and about 570 of mean molecular weight.

This pitch was mixed with other constituents and talc as filler, as enlisted in the following Table II.

The mixing and kneading of the compounding materials was carried out on a calender roll machine at 90° C. for 10 minutes.

The kneaded mixture was processed further under heat, 180° C., and pressure for about 10 minutes to provide shaped final products in the form of rigid plates by way of example. Then, the Vicat softening point was measured.

With SBR-constituent quantities smaller than 10 wt. parts, any acceptable shaped product was not obtained. With an increase of SBR-content, the softening point of the final product increased substantially correspondingly. But, with a higher content of SBR-rubber than 40 wt. parts, the softening point was lowered again.

TABLE III

| Sample number | Wt., parts | Petroleum-cracked pitch, wt. parts | Zinc oxide, wt. parts | Sulfur, wt. parts | Vulcanization accelerator, wt. parts | | Total | Talc | Picart softening point (ASTM D-1525-58T) |
|---|---|---|---|---|---|---|---|---|---|
| | | | | | DM | TT | | | |
| 6 | 7 | 63 | 3.5 | 25 | 0.7 | 0.8 | 100 | 50 | |
| 7 | 12 | 58 | 3.5 | 25 | 0.7 | 0.8 | 100 | 50 | 170 |
| 8 | 20 | 50 | 3.5 | 25 | 0.7 | 0.8 | 100 | 50 | 172 |
| 9 | 30 | 40 | 3.5 | 25 | 0.7 | 0.8 | 100 | 50 | 176 |
| 10 | 37 | 33 | 3.5 | 25 | 0.7 | 0.8 | 100 | 50 | 170 |
| 11 | 50 | 20 | 3.5 | 25 | 0.7 | 0.8 | 100 | 50 | 155 |

NOTE.—DM=dibenzothiazyl sulfide; TT=tetra-methylthyurum sulfide.

EXAMPLE 4

Heavier naphtha, having a range of boiling point: 100–200° C., was preheated to 500° C. to provide its vapor which was then introduced into a reactor heated from outside. The naphtha vapor was thus cracked at 700–800° C. for about 0.8–1.0 second and the cracked mixture was cooled by cold water as before. In this way, a gaseous mixture comprising ethylene, propylene and the like, on the one hand, and a tarry residual mixture, on the other hand, the latter being obtained with a yield of about 24%.

The tarry mixture, 1 kg. was then subjected to distillation at 270° C. and 5 mm. Hg, and a residual pitch, 315 gr., was obtained. This pitch showed a H/C-ratio of 0.61; softening point of 175–190° C. and mean molecular weight about 590.

Several compositions were prepared by adding several different relative quantities of other main constituents, as shown in the following Table IV. To 100 wt. parts of each of the main compositions, 25 wt. parts of talc as filler were added.

For the preparation of the compound, SBR-rubber, petroleum-cracked pitch and talc were kneaded at first on a calender roll machine at 150° C. for 5 minutes, and then further constituents were added thereto and the whole mixture was kneaded together at 90° C. of the roll temperature for about 10 minutes. Then, the mixture was shaped at 185° C. under pressure for 1.0 minute, to provide shaped final products.

The surface properties including the hardness of the shaped products are shown also in the Table IV.

With smaller dose of sulfur than 5 wt. parts, the hardening reaction will not progress as desired, thus the surface hardness of the products being too much inferior to be accepted.

On the other hand, even with a larger dose of sulfur exceeding 30 wt. parts, the surface hardness of the products will not be increased so much that the products surface may frequently appear dull and rather rough and thus far from the desired properties.

TABLE IV

| Sample number | SBR-rubber, wt. parts | Sulfur, wt. parts | Petroleum-cracked pitch, wt. parts | Zinc oxide wt. parts | Vulcanization accelerator, wt. parts DM | Total | Talc, wt. parts | Rockwell hardness, ASTM 795-51A | Surface conditions |
|---|---|---|---|---|---|---|---|---|---|
| 12 | 25 | 7 | 63 | 3 | 2 | 100 | 25 | M 40 | Not roughened. |
| 13 | 25 | 10 | 60 | 3 | 2 | 100 | 25 | M 86 | Do. |
| 14 | 25 | 20 | 50 | 3 | 2 | 100 | 25 | M 87 | Do. |
| 15 | 25 | 27 | 43 | 3 | 2 | 100 | 25 | M 80 | Do. |
| 16 | 25 | 40 | 30 | 3 | 2 | 100 | 25 | M 40 | Roughened. |

NOTE.—DM=benzothiazyl sulfide.

The embodiments of the invention in which an exclusive property or privilege is claimed are as follows:

1. A thermosetting composition, which comprises:
   (a) 25–84.5 parts by weight of petroleum-cracked pitch exhibiting a mean molecular weight of from 400 to 1500, obtained by subjecting a member selected from the group consisting of petroleum oil, heavy oil, naphtha, asphalt, or combinations thereof to thermocracking at a temperature of 700° C., or higher and separating the lighter fractions and constituents having a lower distillation point than 400° C., from the cracked residual mixture,
   (b) 10–40 parts by weight of a rubber having unsaturated double bonds, said rubber being a member selected from the group consisting of a polybutadiene rubber, a SBR rubber, a NBR rubber, polyisoprene, and natural rubber,
   (c) 5–30 parts by weight of sulfur, and
   (d) 0.5–5 parts by weight of a vulcanization accelerator, said pitch having a hydrogen to carbon atomic ratio less than 1.0 and the total parts by weight of all constituents amounting to approximately 100.

2. The thermosetting composition of claim 1, further comprising 800 or less parts by weight of a conventional filler, per 100 parts by weight of the thermosetting composition per se.

3. The thermosetting composition of claim 1, wherein the lower limit of the hydrogen to carbon ratio is 0.4.

4. A shaped product formed by subjecting a thermosetting composition to heat and pressure, said composition comprising:
   (a) 25–84.5 parts by weight of petroleum-cracked pitch exhibiting a molecular weight of from 400 to 1500, obtained by subjecting a member selected from the group consisting of petroleum oil, heavy oil, naphtha, asphalt, or combination thereof to thermocracking at a temperature of 700° C., or higher and separating the lighter fractions and constituents having a lower distillation point than 400° C., from the cracked residual mixture,
   (b) 10–40 parts by weight of a rubber having unsaturated double bonds, said rubber being a member selected from the group consisting of a polybutadiene rubber, a SBR rubber, a NBR rubber, polyisoprene, and natural rubber,
   (c) 5–30 parts by weight of sulfur, and
   (d) 0.5–5 parts by weight of a vulcanization accelerator, said pitch having a hydrogen to carbon atomic ratio of less than 1.0 and the total parts by weight of all constituents amounting to approximately 100.

5. The product of claim 4 further comprising 800 or less parts by weight of a conventional filler, per 100 parts by weight of the thermosetting composition per se.

6. The product of claim 4, wherein the lower limit of the hydrogen to carbon ratio amounts to 0.4.

References Cited

UNITED STATES PATENTS 1,884,240  10/1932  Rhodes et al. _____ 260—28.5 B
3,317,447  5/1967  Black et al. _____ 260—28.5 B MORRIS LIEBMAN, Primary Examiner S. L. FOX, Assistant Examiner U.S. Cl. X.R.

208—44; 260—745

UNITED STATES PATENT OFFICE
CERTIFICATE OF CORRECTION

Patent No. 3,751,389                    Dated August 7, 1973

Inventor(s) Tetsuya HOTTA et al

It is certified that error appears in the above-identified patent and that said Letters Patent are hereby corrected as shown below:

In The Heading:

The claim to priority was omitted. Should read:

February 19, 1969           Japan............12272

Signed and sealed this 19th day of February 1974.

(SEAL)
Attest:

EDWARD M. FLETCHER, JR.          C. MARSHALL DANN
Attesting Officer                Commissioner of Patents